July 16, 1957 E. FLOYD, JR 2,799,721
CONNECTOR
Filed Jan. 9, 1953 2 Sheets-Sheet 1
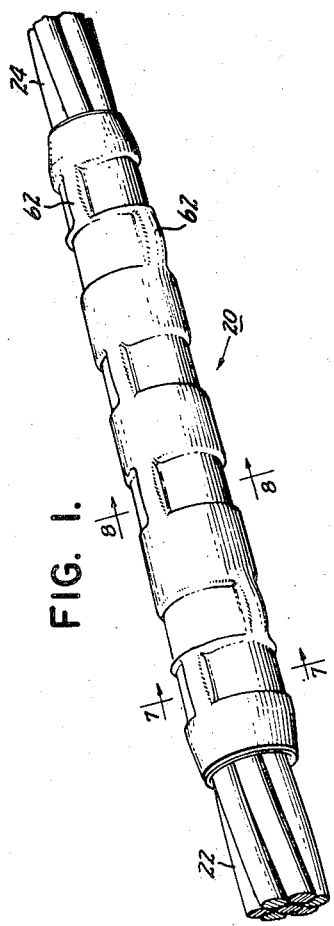
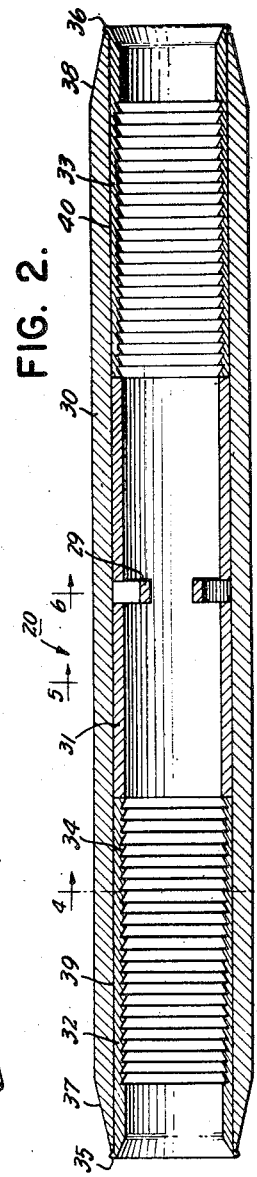
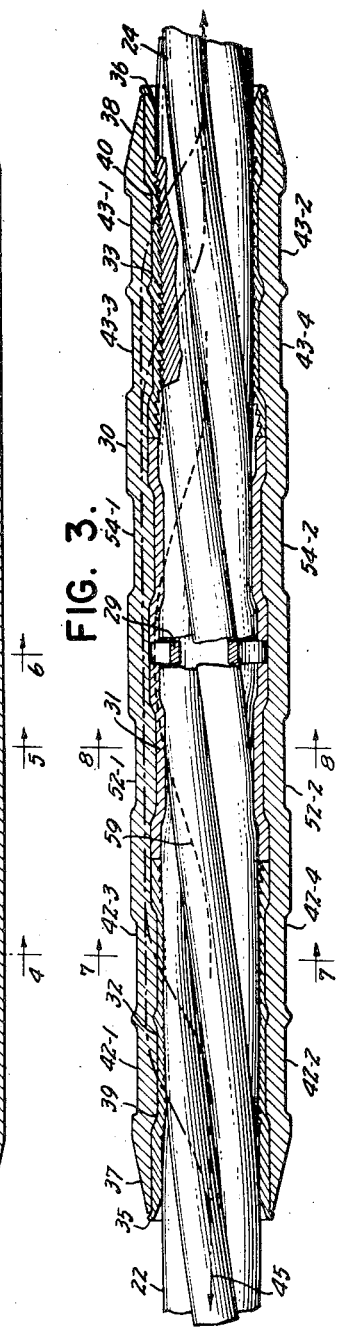
INVENTOR
EDWIN FLOYD, JR.
BY
Curtis, Morris & Safford
ATTORNEYS July 16, 1957

E. FLOYD, JR 2,799,721

CONNECTOR

Filed Jan. 9, 1953

INVENTOR
EDWIN FLOYD, JR.
BY
Curtis, Morris & Safford
ATTORNEYS

United States Patent Office 2,799,721
Patented July 16, 1957

2,799,721
CONNECTOR

Edwin Floyd, Jr., Harrisburg, Pa., assignor to AMP Incorporated, a corporation of New Jersey Application January 9, 1953, Serial No. 330,519

10 Claims. (Cl. 174—94)

This invention relates to connectors for providing durable crimped connections of high tensile strength for wires and cables. More particularly it pertains to a solderless-type connector for providing a permanently crimped, mechanically strong, corrosion resistant connection of good electrical conductivity and wherein the diameter at the connection is only slightly greater than the diameter of the wire or cable itself and its over-all length is relatively small. The described connection embodying the present invention is of the type which is made by telescoping a ferrule portion of the connector over the bare end of a wire or cable, either solid or stranded or a combination thereof, and then permanently crimping the walls of the ferrule against the wire or cable.

This invention is particularly advantageous for use with wires or cables of relatively high tensile strength. For example, in the electrical power transmission and communication fields and in other similar installations it is customary to employ transmission cables and guy wires of relatively high strength to permit stringing them over wide spans. In splicing together the ends of such cables and guy wires and in making other connections thereto, it has been customary in the past to use clamping plates with numerous bolts or other compression-exerting members for holding the clamps in engagement with the wire. Such arrangements have several disadvantages: they are bulky and heavy and make the portion of the wire carrying the connection difficult to handle under service conditions. For example, such connections tend to catch when slid through confined spaces, and they cannot readily be fed over the cross arms of telephone poles, or around reels and the like. Such clamping arrangements usually are prone to loosening under vibration and temperature changes. Moreover, the conductive joint itself is more or less exposed so that in outdoor installations and under other severe service conditions, progressive, chemical and electrolytic corrosion takes place at the interface between the surface of the wire and the clamp. Thus, the joint is progressively weakened, and where it is used to carry any substantial current, the increased resistance of the corrosion layer causes heating and further increases the rate of deterioration. Also, such clamping arrangements require several parts and take time to assemble.

Various crimped connectors have been proposed or used in the past, for example, such as ones utilizing a conductive outer sleeve, with the conductive junction being made at the extremities of the sleeve. However, in these connectors also, the conductive joint is more or less exposed allowing such corrosion and weakening of the joint to take place. Moreover, the conductive sleeve is subjected to the full tensile forces and tends to elongate, placing substantial forces on the cable at the conductive junction and on the conductive interface itself, thus tending to reduce the cross section of the cable at the conductive junction and to pull the cable away from it. With crimped-type connectors where the conductive joint is thus exposed it has sometimes been found desirable to surround the whole connection with an elongated sealing sleeve having cylindrical plugs in each end and to inject this outside sleeve with a corrosion inhibitor such as red lead or zinc chromate. The result of such an arrangement is a bulky connection of relatively great size and over-all length.

One aspect of the embodiment of the present invention described herein provides a connection having a relatively small over-all size and one which does not require the injection of corrosion inhibiting compositions.

Another aspect of the present invention provides a connection wherein tensile forces tend to tighten the union between the cable and the connector. An advantage of the present invention is that the outside of the connector is an integral sleeve surrounding the joint interface across which the electrical current passes, thus sealing it from any corrosive agents.

Because of the extreme corrosion resistance of connections embodying the present invention and their durability in the presence of mechanical vibration, these connectors may be advantageously used under all severe service conditions irrespective of whether there is a high tensile force on the wire or cable to which the connection is made. For example, along railroad tracks, near certain chemical equipment, or in seaboard installations there are atmospheric concentrations of sulphides, acids, salt-laden moisture or other corrosive agents in the presence of which connections made according to the present invention are extremely durable.

Another aspect of the present invention provides a separate bridging arrangement whereby the tensile forces are transmitted through a portion of the connector substantially independent from the current-carrying portion, whereby changes in the tensile forces can have substantially no effect on the conductivity of the connection.

Due to its high tensile strength, light weight and ease of fabrication, a connection embodying the present invention is well suited for the purpose of splicing cables and wires even where they are not used to carry current, for example such as a guy wire.

It is an object of the present invention to provide a connector suitable for use under severe service conditions and capable of withstanding tensile forces equal to the ultimate strength of the cable or wire on which it is crimped. A further object is to provide crimped connections of good electrical conductivity, small diameter, and having great corrosion resistance.

Various other objects, aspects, and advantages of my invention will be in part pointed out and in part apparent from the following description, taken in conjunction with the accompanying drawings.

Figure 1 is a perspective view of a connector, generally indicated at 20, crimped onto the abutting ends of a pair of cables 22 and 24 to form a butt splice;

Figure 2 is a longitudinal sectional view of the uncrimped form of the connector 20;

Figure 3 is a longitudinal sectional view of the crimped connection shown in Figure 1;

Figure 4:
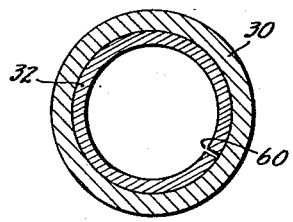
Figure 5:
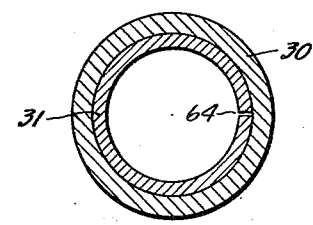
Figure 6:
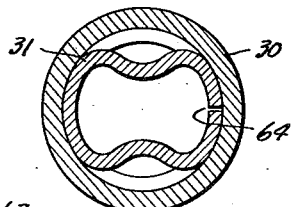
Figure 7:
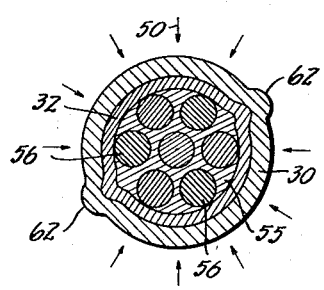
Figure 8:
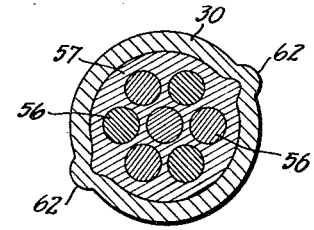
Figure 9:
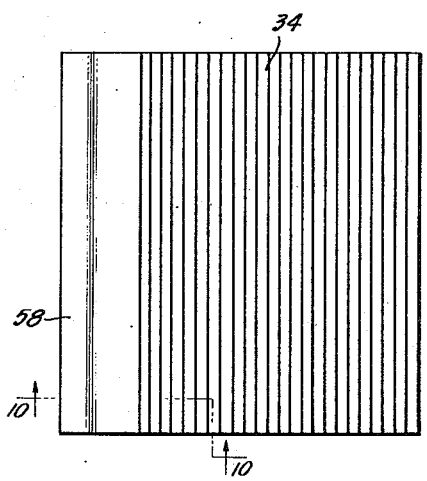
Figure 10:
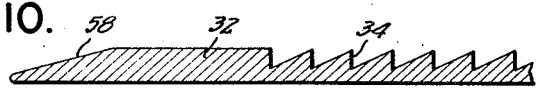

Figures 4 and 5 are sectional views taken transversely through the uncrimped connector 20 as it is shown in Figure 3 along the lines 4—4 and 5—5, respectively;

Figure 6 is a sectional view taken transversely through the center of the connector showing a wire stop;

Figures 7 and 8 are sectional views taken transversely through the crimped connector 20 and cable 22 along lines 7—7 and 8—8 of Figure 1 or Figure 3. These cross sectional views of the crimped connector as shown in Figures 7 and 8 correspond to the same portions of the uncrimped connector as shown in Figures 4 and 5;

Figure 9 shows a serrated rectangular plate, which is to be rolled to form a gripping sleeve forming part of the connector as explained hereinafter; and Figure 10 shows an enlarged partial cross-sectional view of this sheet, taken along the line 10—10 of Figure 9.

As shown in Figure 1, in forming a high strength, high conductivity connection embodying the present invention the ends of a pair of cables 22 and 24 are slid into the opposite ends of the tubular connector, generally indicated at 20, and its walls are then crimped inwardly at several places against the cables to complete the splice, as explained in detail hereinafter. In the form of connection shown in Figure 1, the indentations made in the walls of the connector are formed by a pair of approximately semi-circular concave dies to produce a cross sectional form of crimp such as is shown in Figure 7.

Figure 2 shows a longitudinal sectional view of the uncrimped connector 20, which, generally comprises a tubular outer jacket 30, of high tensile strength, for example, of stainless steel, within which are located a copper sleeve 31 serving to provide a conductive bridge between the cables 22 and 24 when the connection is made and having a stop 29 formed in the center thereof. A pair of identical gripping sleeves 32 and 33 of a hard material, such as stainless steel, arranged to hold these cables after crimping, are located within the ends of the jacket.

The copper sleeve 31 is fitted within the jacket 30 but not secured thereto and is centrally located along the axis of the jacket and occupies roughly one-third of the length of the jacket. The gripping sleeves 32 and 33 are slid into the ends of the jacket 30 and are brazed in place so as to withstand the tensile forces in the cables and to hold the copper sleeve in place between their inner ends. Thus, the copper sleeve is free to move slightly during crimping, with the result that it can accommodate any lengthwise motion or extrusion of the cables during crimping. Thus, the conduction joint is rendered more free from stresses, as will be understood.

This connector 20 is particularly adapted for splicing high strength transmission cables or wires. These cables are often stranded and include a number of individual strands of high tensile strength steel, each strand being coated with an outer copper layer of jacket. There are a wide variety of such cables in use today having different numbers and sizes of strands and also including different combinations of copper clad steel strands and solid copper strands in the same cable. Some of these cables have only three strands, and others have seven or more strands.

In order to form a strong and tightly sealed connection irrespective of the number and composition of the strands in the cables being joined, the steel gripping sleeves 32 and 33 are internally serrated, preferably by means of a buttress type of serration 34 (see Figure 9) in which the more abruptly inclined wall of each individual serration faces toward the central portion of the connector. Thus, when the connector is crimped, each of these serrations bites into the sides of the cables, and particularly in the case of cables as described above, they bite into the solid copper strands or bite through the copper coating on the steel-cored strands, and may bite slightly into the surfaces of the steel cores themselves. These gripping sleeves are preferably formed with bell mouths 35 and 36 projecting slightly beyond the tapered ends 37 and 38 of the outer jacket so as to aid in guiding the ends of the cables when they are inserted into the connector. They are brazed within the jacket 30 along the interfaces 39 and 40 (see Figure 2) extending substantially the full length of each sleeve. The tapered portions 37 and 38 aid in preventing the connection from "snagging" on the cross arms of poles, etc. when the cable is being strung into place.

Figure 3 shows a longitudinal sectional view of the connection shown in Figure 1. In forming this connection the ends of the cables 22 and 24 are inserted into the connector 20 until they abut against the wire stop 29 at its midpoint. They both project near to the center of the copper sleeve 31 in an adjacent end-to-end relationship. An equal number of individual pairs of approximately semi-circular indentations are then made in each half of connector 20. These indentations are arranged in an approximately symmetrical relationship to obtain the most effective action of the gripping sleeves 32 and 33 and of the conductive bridging sleeve 31. In order to obtain a connection whose strength is as great as the strength of the cables being joined, irrespective of whether they are of the type having a maximum tensile strength and formed only with steel-cored strands of extra high strength or whether they are of lesser strength and include one or more solid copper conductors, I have found that it is preferable to use at least two pairs of indentations on those portions of the gripping sleeves and that in some cases only one pair of indentations is necessary over each half of the copper sleeve 31. Acccordingly, two pairs 42—1 and 42—2, and 42—3 and 42—4 of these indentations are located near the end 37 of the connector so as to force the serrations of the sleeve 32 into the surfaces of the strands of the cable 22. Correspondingly, two pairs 43—1 and 43—2, and 43—3 and 43—4 of indentations are made near the other end 38 overlying the sleeve 33.

No definite order of crimping is necessary. However, I prefer to start with the centrally located crimps described in detail hereinafter, located over the conductive sleeve 31, and then to work progressively toward both ends by making 42—3 and —4, and 43—3 and —4 and then making the outer crimps. This order of crimping reduces the lengthwise extrusion effects at the conductive joint so that this connection is substantially stress free, as described hereinafter.

It should be noted that these two pairs of indentations at each end of the connector 20 serve to carry substantially the entire tensile force of the spliced cables, and that the strength of the connection is equal to or greater than the ultimate strength of the cable itself.

The action of the gripping sleeves 32 and 33 in carrying the tension in the spliced cables may be explained by following the distribution of stresses within the connection starting with the end of the cable 22. At the bell mouth 35 of the gripping sleeve 32, the cable 22 is under full tension. Proceeding further to the right along the cable 22 the indentations 42—1 and 42—2 are reached, and the serrations of the sleeve 32 bite into the cable and progressively begin to take up the tension stresses in the cable. These tension forces are transferred from the sleeve 32 through the brazed interface 39 to the jacket 30. The second pair of indentations 42—3 and 42—4 act in the same fashion progressively to take up the remaining tension stresses from the cable 22 and transfer them to the outer jacket 30 so that substantially all tension stresses are removed from the cable before it enters the conductive sleeve 31. These tension forces are passed through the jacket 30 to the pairs of indentations 43—4 and 43—3 and 43—2 and 43—1 where they are progressively transferred back into the other cable 24. Thus, substantially all the tension forces are bridged around the electrical joint formed by the conductive sleeve 31 as shown by the double-headed arrow 45 and can have very little effect on the conductivity of this joint.

As mentioned above, the serrations in each of the sleeves 32 and 33 are of a buttress form with the more abruptly inclined surfaces facing toward the center of the connector. The effect of this buttress formation is to cause each individual serration to bite into the surface layers of the cable strands. Increasing tension forces these serrations to bite further into the cable, the metal of the cable strands tends to build up behind each serration, thus holding the cable more securely.

These buttress serrations have abrupt faces which are substantially perpendicular to the axis of the connector and which face toward the longitudinal center of the connector, that is, in each case away from the direction in which the tensile forces are applied. These buttress serrations act very well in resisting the large forces of high tensile applications without tending to open the connector. Under large tension forces, the abrupt faces of the serrations bite into the material of the cable strands, but since these faces are perpendicular to the axis of the cable, the metal of the cable cannot exert any wedging or camming action against them; so there is no wedging action tending to open the connector. That is, there are no resulting outward force components tending to wedge open the tensile joints, such as may be present where other forms of serrations are used.

The form of crimp used in the connections of Figures 1 and 2 encloses a large portion of the full periphery of the tubular jacket in the crimping dies during the crimping operation, the forces applied to the connector are substantially radial, as indicated (in Figure 6) by the arrows 50. Hence, an increased pressure per unit area is experienced by the gripping sleeves which is considerably more than was applied to the outer surface of the jacket 30. A slight amount of cold flow of the stainless steel in the jacket and a somewhat greater amount in the gripping sleeves takes place during crimping. An even greater amount of flow takes place in the strands of the cable, particularly in the copper jackets on the steel cores 56 of the strands of the cable 22, or, when solid copper wires are present, in these solid copper wires. The result as shown in Figure 6 is that all of the voids originally existing between individual strands and between the strands and the inside surface of the gripping sleeves are filled by a copper seal or matrix 55, acting to seal the connection and protecting the electrical joint from the action of corrosive agents. A double seal is in effect provided by having two pairs of indentations on each end of the connection, thus providing two solid matrices, preventing any corrosive atmospheres from reaching the central conductive junction, described hereinafter.

The electrical junction, as seen in Figure 3, is formed by the conductive sleeve 31 which is crimped onto the ends of both cables and bridges the current from one to the other. A single pair of indentations 52—1 and 52—2, and 54—1 and 54—2 is used on the portions of the jacket 30 overlying each half of the sleeve 31. As explained above, the pressures exerted in the interior of the crimped portions of the connection are large, and in forming the electrical junction, they cause considerable cold flow of both the copper sleeve 31 and of the copper in the cable. The cross section in Figure 7 shows the resulting solid conductive matrix 57 formed by the copper sleeve 31 (see Figure 5) and the copper coating on the steel cores 56 of the strands of the cable. Since the tensile stresses in the connection are substantially all borne by the jacket, carried along the path 45 and bridging around the conductive junction, changes in tensile forces caused by such factors as changing wind loads on the cables, ice loads, and expansion and contraction of the cables with changes in ambient temperature have little effect on the solid conductive junction or matrix 55 formed by the crimps 52—1 and 52—2, and 54—1 and 54—2. Thus, the conductive joint is maintained substantially stress free, providing high conductivity and long life. The path of conduction of current through the joint is schematically illustrated in Figure 3 by the dotted line 59.

The high tensile strength electrical transmission cables described above are manufactured in several different standard, nominal diameters. For example, stranded cables are commercially available in sizes running from three #12 wires to three #5's, from seven #10's to seven #4's, from nineteen #9's to nineteen #5's, and possibly others. The seven stranded cables have nominal diameters from 5/16 of an inch to 5/8 of an inch, and the nineteen stranded ones cover the range from 9/16 to 7/8 of an inch. In each of these sizes the cable may comprise all copper-clad high tensile steel-cored wires, or in applications requiring a higher conductivity and suitable for a cable of somewhat lesser tensile strength, the cables may include some solid copper wires in place of the steel-cored strands. Connectors embodying my invention may be used with all of the different sizes of cables above and may be used with all of the different combinations of solid copper and steel-cored wires which are available. I have found that connectors embodying my invention test particularly well when used with: the three stranded cable having all steel-cored wires, the three stranded cable having one solid copper strand and two steel-cored strands; the seven-stranded cable having all steel-cored strands, the seven-stranded cable having one, two or three solid copper strands, and, respectively, six, five, or four steel-cored strands; and the nineteen strand cable having all steel-cored strands. As mentioned above, each combination of different sized strands provides a cable having different tensile strength, and connectors made in accordance with my invention are approximately as strong as the maximum cable strength for each of the several different nominal cable sizes.

A 5/16 inch (nominal diameter) cable may comprise seven strands of #10 wire or three strands of #7 wire, and a connector embodying my invention for a cable of this diameter may comprise an integral tubular jacket of a high tensile strength material such as heat treated steel or stainless steel and having an overall length approximately eight times its outside diameter and approximately ten or eleven times its inside diameter. The overall length may be approximately four inches, with an outside diameter of .500 inch, and an inside diameter of .375 inch. The ratio of the length of the connector to its internal diameter or the outside diameter of the cable is approximately twelve or thirteen to one. The outside surface of the jacket near each end is tapered for a distance of approximately 1/4 inch down to an outside diameter of .400 inch at each end. The number of crimps will depend somewhat upon the size and type of cable and the amount of tensile strength required. In some applications it may be desirable to increase the proportionate length of the connector, but in most work, these proportions are preferable in this size range.

Although it is possible to use seamless tubing to form the gripping and conductive sleeves within the connector, I prefer to use sleeves formed from rectangular pieces of sheet material. Thus, for a 5/16 inch cable, the copper sleeve 31 may be formed to have a length of 1½ inches, an inside diameter of .312 inch and an outside diameter of .375 inch, which produces a press fit of the sleeve 31 within the jacket 30. The wire stops 29 are formed as shown in Figure 6 by shearing the sleeve in two places on opposite sides and indenting the material between the cuts before the sleeve is inserted within the jacket. As shown in Figures 5 and 6 a small gap 64 may remain when this sleeve is formed.

Each of the gripping sleeves 32 and 33 (for a 5/16 inch cable) may be formed from a rectangular stainless steel blank (see Figure 9) having a length of approximately 1.25 inches and a width of 1.062 inches, and being .031 inch thick. The serrations are formed on one surface of the blank and cover approximately one inch of its length, and a bevel 58 is provided on the uncrimped end and it is rounded to form the bell mouth described above. The serrations are each approximately .020 inch deep with a pitch or spacing of approximately .040 inch therebetween. These serrations may be cut in the inside of the gripping sleeve after it is rolled up, to have a helical form, or they may be milled in the sheet before it is rolled into the sleeve form, as I prefer, in which case they may be oriented transversely to the length of the sheet and in planes perpendicular to the axis of the sleeve, as shown.

In order that the strength of the connection may be as great as the tensile strength of the cable itself, I have found that the relationship between the relative dimensions of the buttress serrations, the diameter of the cable, and the overall length of the connector, should be such that the small indentations or nicks in the side of the cable caused by the bitting action of the high points of the serrations are sufficient to bear the high tensile forces involved without weakening the cable near the outside ends of the connector. The above-set-forth proportions meet this requirement.

The sheet is rolled to form the sleeve 32 having an inside diameter of .312 inch and an outside diameter of .374 inch, and as shown in Figure 4, a small gap 60 may remain in each of the sleeves. As may be noted by a comparison of Figures 4 and 6, it is preferable to orient the gap 60 so that it does not align with the gap 64.

These gripping sleeves are brazed in place within opposite ends 37 and 38 along the interfaces 39 and 40 using a material which will bond with stainless steel and which melts and flows easily at a relatively low brazing temperature. A suitable type of brazing material is a silver solder having a silver content in the range from approximately 35 to 50% by weight and melting and flowing in the range from 1,125° to 1,450° Fahrenheit. An example of a suitable material is the one sold by Handy and Harman, Inc., under the trade designation of "Easy-Flow," and described in their Bulletin 20, copyright 1950. Another suitable material is sold by the Eutectic Welding Alloys Corporation, and described in its National Defense Series Bulletin #1, fourth edition, copyright 1951, as compound number 181.

These brazed interfaces 39 and 40 are made along the entire length of the sleeves 32 and 33, so that in making each of these connections, care must be taken to provide sufficiently uniform heat along the length of the joints so that the silver solder can flow the full length thereof and yet not overheat and weaken the stainless steel of the jacket or of the sleeves.

Using a connector as described above on a 5/16 inch stranded cable having seven strands of No. 10 copper clad steel-cored wire of high strength, tensile tests have shown that the connection is stronger than the wire. With such a test, the cable breaks at a value of approximately 8,700 pounds and the break occurs outside of the connection.

As another example of an embodiment of my invention, a connector for a 7/16 inch cable may comprise a tubular outer jacket of high tensile strength material, such as stainless steel, or heat treated steel, and with a length of six inches, an O. D. of 3/4 inch, and an I. D. of 9/16 inch, thus having a length approximately eight times its outside diameter and approximately nine or ten times its inside diameter. The sheet material used to form the sleeves is approximately 1/16 inch thick, to provide an internal diameter for the connector as a whole of approximately 7/16 inch; so that the connector has a length approximately thirteen or fourteen times its internal diameter. Each of the sleeves in a connector of this size may be two inches long. In crimping this connector for a 7/16 inch cable, I prefer to use three crimps for each tension connection and two for each conduction connection, providing a total of ten crimps, as compared to six for a 5/16 inch cable.

A connection made on a 7/16 inch cable using a connector as described above is as strong as the cable. For example, in testing, it has been found that with such a connector crimped onto a 7/16 inch stranded cable composed of seven strands of No. 7 copper clad steel-cored wire the cable breaks outside of the connection at a force of approximately 15,800 pounds.

For a 5/8 inch cable, the connector may comprise a jacket eight inches long with an O. D. of one inch and an I. D. of 3/4 of an inch. The sheet material for the sleeves may be approximately 1/16 inch thick, providing the desired internal diameter of 5/8 of an inch for the connector as a whole. Thus the connector has a length roughly eight times its O. D. and the jacket is roughly ten or eleven times its I. D. The connector as a whole has a length about twelve or thirteen times its I. D. In crimping this size connector, four crimps are used for each tension connection and two crimps for each conduction connection, a total of twelve crimps.

From the above examples, it will be apparent that connections as strong as the cables for a range of cable sizes can be obtained with a connector whose overall length is at least ten times the cable diameter, but need be no more than roughly twelve to fourteen times this diameter and no more than approximately eight times the outside diameter of the connector. The length of the high tensile connector jacket is at least eight times but need be no more than only approximately nine to eleven times its I. D. Its length is at least six times its outside diameter but need be no more than roughly eight times this diameter. Thus, the connector is strong and yet relatively light in weight. It has no moving parts to cause difficulty during its application. Moreover, in all of the connections formed according to my invention the conductive interface is sealed within the high tensile jacket and is protected thereby.

As mentioned above, Figure 1 shows a semi-circular form of crimp. In using this crimp I find that it is preferable to orient the dies during successive crimping operations so that there is approximately a 90° displacement between the protruding or "flash" portions 62, of adjacent pairs of crimps. The result is a more symmetrical and somewhat stronger connection.

From the foregoing it will be observed that connectors and connections of high tensile strength, good electrical conductivity and having high corrosion resisting properties are provided, and that they are well adapted to attain the ends and objects hereinbefore set forth and are subject to a variety of modifications as may be desirable in adapting the invention to different applications.

I claim:

1. A connector of the solderless type for use wherein a connection is to be made by crimping and adapted for forming a butt splice of high tensile strength between a pair of cables placed in end-to-end relationship comprising: a seamless cylindrical jacket having a high tensile strength, a pair of hard gripping sleeve inserts secured within opposite ends of said jacket, each of the sleeves being approximately one-third of the length of said jacket and having transverse buttress serrations extending substantially the full length of the inside surface the abrupt faces of the serrations in the sleeves facing inwardly, and a highly conductive sleeve insert within said jacket between said gripping sleeves, the length of said conductive sleeve being approximately one-third of the length of said jacket, said sleeve fitting loosely within said jacket and having an internal diameter substantially commensurate with the internal diameter of said gripping sleeves, whereby a connection is made by crimping portions of the jacket overlying said conductive sleeve to depress said conductive sleeve against the ends of said cables to form a conductive connection therebetween and by crimping portions of the ends of said jacket to depress said gripping sleeves to grip the cables on opposite sides of said conductive connection so that said gripping sleeves absorb any tension forces from the cables and transfer these forces to said jacket substantially to remove these forces from the conductive connection.

2. An electrical connector of the solderless type for use wherein a connection is to be made by crimping and adapted for forming a butt splice of high tensile strength between a pair of cables placed in end-to-end relationship comprising: a seamless tubular jacket having a central portion with an imperforate wall and having a high tensile strength, said jacket having a predetermined inside diameter, a pair of hard gripping sleeve inserts each having a length roughly equal to one-third of the length of the jacket and each having an inside surface with transverse serrations extending substantially the full length thereof and each having an outside diameter slightly less than the inside diameter of said tubular jacket to provide an interface region between the outside of each of said gripping sleeves and said jacket, a bonding material in each of said interface regions to secure said sleeves to said jacket and to seal up said interface regions, and a highly conductive sleeve insert fitted within said jacket and positioned between said gripping sleeves, said conductive sleeve having an inside dimension substantially commensurate with the inside of said gripping sleeves, whereby a connection is made by crimping portions of the jacket overlying said conductive sleeve to depress said conductive sleeve against the ends of said cables to form a conductive bridge therebetween and by crimping portions of the ends of said jacket to depress said gripping sleeves to grip the cables on opposite sides of said conductive bridge so that said gripping sleeves absorb any tension forces from the cables and transfer these forces to said jacket substantially to remove these forces from the conductive bridge and so that said gripping sleeves after crimping serve to seal up the central portion of said jacket around said conductive bridge.

3. A connector of the solderless type for use wherein a connection is to be made by crimping and adapted for forming a butt splice of high tensile strength between a pair of cables placed in end-to-end relationship comprising: a seamless cylindrical jacket having an imperforate central portion and a high tensile strength, a pair of hard gripping sleeve inserts secured within opposite ends of said jacket, each of the sleeves having transverse serrations extending substantially the full length of its inside surface, and a highly conductive sleeve insert within said jacket between said gripping sleeves, whereby the connection is made by crimping portions of the jacket overlying said conductive sleeve to squeeze said conductive sleeve upon the ends of said cables to form a conductive connection therebetween and by crimping portions of the ends of said jacket to squeeze said gripping sleeves to grip the cables on either side of said conductive connection to remove any stresses from the cables so that said conductive connection is substantially isolated from forces applied to the cables.

4. An electrical connector of the solderless type for use wherein the connection is made by crimping the sides of the connector inwardly and particularly adapted for providing a high tensile strength connection between the end of an electrical cable and another conductor comprising: a tubular jacket of high tensile strength having a predetermined inside diameter and a first end portion adapted to receive the end of the cable and to be crimped thereto to absorb any tension forces therein and a second portion adapted to surrounded the end of the cable and to be crimped thereto to form a conductive junction therewith and to be connected to the conductor, a hard gripping sleeve insert within said first end portion of the jacket and having an outside diameter slightly less than said predetermined inside diameter of the jacket to provide an interface region therebetween, a bonding material in said interface region to secure said sleeve within said jacket, said sleeve having an inside surface with transverse buttress serrations facing toward said second portion of the jacket, and a conductive sleeve insert within said second portion of the jacket.

5. An electrical connector having a predetermined inside diameter and adapted for forming a butt connection of high tensile strength between the ends of a pair of electrical cables placed in end-to-end relationship comprising: a seamless tubular jacket having a high tensile strength and having an axial length which is at least ten times said predetermined diameter, a conductive sleeve insert having an axial length which is roughly equal to one-third of the length of said jacket, said sleeve being press fitted within said jacket approximately centrally thereof and having an inside diameter approximately equal to said predetermined diameter, a pair of hard gripping sleeve inserts each also having a length equal roughly to one-third the length of the jacket and an inside and outside diameter approximately commensurate respectively with those of the conductive sleeve, said gripping sleeves having an inside surface substantially covered with transverse buttress-type serrations with a plurality of abrupt faces, the abrupt faces of said serrations facing toward the conductive sleeve, said gripping sleeves being adjacent opposite ends of said conductive sleeve and being brazed in place within opposite ends of said jacket.

6. An electrical connection of the solderless type formed on the end of an electrical cable and adapted to be connected to another conductor, wherein the connection is made by crimping the sides of a barrel portion of a connector inwardly onto the end of an electrical cable inserted therein, said connection comprising: the bare end of an electrical cable, a tubular barrel of high tensile strength having a first end portion surrounding part of said cable and a second portion surrounding the end of said cable and adapted to be connected to said conductor, a hard gripping sleeve insert secured within said first end portion of said barrel, and said sleeve having an inside surface substantially covered by buttress serrations transverse to the axis of said barrel, a conductive sleeve insert within said second portion of said barrel, the walls of said first end portion of said barrel being crimped in at least two adjacent places to hold said gripping sleeve tightly surrounding said cable to grip said cable and to form a pair of seals, the walls of said second portion of said barrel being crimped in at least one place to hold said conductive sleeve tightly around said cable end to form a unified conductive matrix of said end and conductive sleeve.

7. An electrical connector for forming a butt connection of high tensile strength between the ends of a pair of electrical cables placed in end-to-end relationship comprising: a seamless tubular stainless-steel jacket having a substantially uniform wall thickness with an outside taper reducing the outside diameter near each end of the jacket, said jacket having an axial length which is at least eleven times the outside diameter of the cables, a conductive sleeve insert rolled up from a sheet of highly conductive material and having an axial length which is roughly equal to one-third of the length of said jacket and an inside diameter which is slightly larger than the outside diameter of the cables and an outside diameter approximately equal to the inside diameter of the tubular jacket, said sleeve insert being centrally located within said jacket, a pair of gripping sleeve inserts each rolled up from a sheet of stainless-steel, each having a length equal roughly to one-third the length of the jacket and an inside and outside diameter approximately commensurate respectively with those of the conductive sleeve and with transverse buttress serrations providing a plurality of abrupt faces, said serrations covering substantially the entire inside surface, and with their abrupt faces facing said conductive sleeve, each of said gripping sleeves having a bell mouth projecting slightly beyond the end of the jacket and being brazed within opposite ends of said jacket adjacent opposite ends of said conductive sleeve.

8. An electrical connection of the solderless type between the ends of a pair of electrical cables placed in end-to-end relationship comprising: a pair of electrical cables in end-to-end relationship, a tubular jacket of high tensile strength surrounding the adjacent ends of said cables, a pair of hard gripping sleeve inserts, each gripping sleeve surrounding one of the cables and being secured within one end of said jacket and having an inside diameter slightly larger than the diameter of said cables with transverse buttress serrations covering a substantial portion of its inside surface, a conductive sleeve insert centrally located within said jacket between said gripping sleeves and surrounding the adjacent ends of said cables, said conductive sleeve having an inside diameter slightly larger than the diameter of said cables, the walls of said jacket being crimped in at least two adjacent places over each of said gripping sleeves, each of said crimps compressing said sleeves inwardly against the cable therein, whereby the serrations in said sleeves bite into the cables and cold work the cables to form a tension resisting connection and effectively a seal, and the walls of said jacket being crimped in at least two places over said conductive sleeve insert, each of said latter crimps compressing the conductive sleeve onto the end portion of one of the cables to form a conductive junction between said conductive sleeve and each of said cables.

9. An electrical connector of the solderless type for use wherein the connection is made by crimping the sides of the connector inwardly and particularly adapted for providing a high tensile strength connection between the end of an electrical cable and another conductor comprising: a tubular seamless jacket of high tensile strength having a predetermined inside diameter and a first end portion adapted to receive the end of the cable and a second end portion adapted to surround the end of the cable and to be connected to the conductor, a hard gripping sleeve insert within said first end portion of the jacket formed from a sheet of hard material having a plurality of parallel transverse buttress serrations cut in one surface with a portion of said surface along one edge parallel to said serrations being free of said serrations and said sheet being rolled up to form a cylinder having an inside surface with said transverse buttress serrations facing toward said second portion of the jacket and having an outside diameter slightly less than said predetermined inside diameter of the jacket to provide an interface region therebetween, a bonding material in said interface region to secure said sleeve within said jacket, and a conductive sleeve insert within said second portion of the jacket.

10. An electrical connection of the solderless type on the end of an electrical cable and adapted to be connected to another conductor, wherein the connection is made by crimping the sides of a barrel portion of a connector inwardly onto the end of an electrical cable inserted therein; said connection comprising: the bare end of an electrical cable, a tubular barrel of high tensile strength having a first end portion surrounding part of said cable and a second portion connected to the end of said cable and adapted to be connected to said conductor, a hard gripping sleeve insert brazed within said first end portion of said barrel, and said sleeve having an inside surface substantially covered by buttress serrations transverse to the axis of said barrel, said serrations being .020 inch deep and spaced .040 inch apart, a conductive sleeve insert within said second portion of said barrel, the walls of said first end portion of said barrel being crimped in at least two adjacent places to hold said gripping sleeve tightly surrounding said cable to grip said cable and to form a pair of seals, the walls of said second portion of said barrel being crimped in at least one place to hold said conductive sleeve tightly around said cable end to form a unified conductive matrix of said end and conductive sleeve.

References Cited in the file of this patent

UNITED STATES PATENTS

| | | |
|---|---|---|
| 1,886,086 | Damon | Nov. 1, 1932 |
| 1,910,269 | Sunderland | May 23, 1933 |
| 2,158,892 | Becker | May 16, 1939 |
| 2,166,458 | Berndt et al. | July 18, 1939 |
| 2,180,866 | Cryer | Nov. 21, 1939 |
| 2,327,650 | Klein | Aug. 24, 1943 |
| 2,576,528 | Matthysse | Nov. 27, 1951 |

FOREIGN PATENTS

| | | |
|---|---|---|
| 852,621 | France | Oct. 30, 1939 |